United States Patent
Angsten

[11] 3,780,708
[45] Dec. 25, 1973

[54] ROTARY COMBUSTION ENGINE

[75] Inventor: Robert J. Angsten, Southfield, Mich.

[73] Assignee: General Motors Corporation, Detroit, Mich.

[22] Filed: Sept. 15, 1972

[21] Appl. No.: 289,479

[52] U.S. Cl............................. 123/8.17, 123/8.33
[51] Int. Cl............................................ F02b 53/04
[58] Field of Search................. 123/8.17, 8.33, 43 R

[56] References Cited
UNITED STATES PATENTS

| | | | |
|---|---|---|---|
| 1,859,618 | 5/1932 | Cleland | 123/8.33 |
| 3,118,432 | 1/1964 | Peterson | 123/8.17 |

FOREIGN PATENTS OR APPLICATIONS

| | | | |
|---|---|---|---|
| 713,923 | 8/1931 | France | 123/8.33 |
| 910,447 | 11/1962 | Great Britain | 123/8.17 |

*Primary Examiner*—Carlton R. Croyle
*Assistant Examiner*—Michael Koczo, Jr.
*Attorney*—J. L. Carpenter et al.

[57] ABSTRACT

A rotary combustion engine has a rotor concentric with and rotatable about a stator with the rotor and stator cooperatively defining a plurality of working chambers that are spaced about and rotate with the rotor. A plurality of baffles are mounted on the stator and move radially inward and outward to follow the rotor's interior peripheral contour to sequentially divide each of the chambers during each rotor revolution into two sealed portions. As the chambers rotate, one of the baffles operates to provide one of the working chambers with a sealed chamber portion which expands during an intake phase while connected to an intake port in the stator and thereafter another baffle operates to provide this one working chamber with a sealed portion containing the intake mixture which is compressed during a compression phase and delivered by porting in this baffle to a storage charge chamber in the stator. Another baffle then separates this one working chamber into a sealed portion to which the compressed mixture is delivered from the storage chamber via porting in this baffle with the compressed mixture then being ignited by a spark plug on the stator. Another baffle then divides this one working chamber into a sealed portion from which the products of combustion are exhausted to an exhaust port in the stator while the other sealed portion of this one chamber undergoes a similar cycle on the same rotor revolution via similar intake porting, baffles, storage charge chamber, spark plug and exhaust porting.

4 Claims, 14 Drawing Figures

3,780,708

ROTARY COMBUSTION ENGINE

This invention relates to rotary combustion engines and more particularly to rotary combustion engines having concentric stator and rotor bodies.

The rotary combustion engine according to the present invention has a rotor concentric with and supported for rotation about a stator. The stator has an exterior peripheral wall cooperating with an interior peripheral wall and two interior side walls on a rotor to provide a plurality of working chambers, there preferably being three such chambers that are spaced about and rotate with the rotor. Intake and exhaust ports in the stator extend through the stator's peripheral wall and are sequentially periodically opened to the working chambers by portions of the rotor's interior peripheral wall. Baffles are mounted on the stator for radial movement to maintain contact with the rotor's unbroken interior peripheral wall and sequentially periodically divide the working chambers into sealingly separated portions during rotor rotation to provide an engine operating cycle wherein each working chamber during an operating cycle is divided by one of the baffles into a sealed portion which is connected to intake air-fuel mixture as this portion expands. This working chamber is then sealingly divided by another baffle into a sealed portion which contains the air-fuel mixture and is decreas-ing in volume and is connected through porting in this baffle to a storage charge chamber in the stator. On continuing rotor rotation, the air-fuel mixture continues to be compressed with this phase being completed when another baffle then separates this working chamber into a sealed portion to which the compressed air-fuel mixture is fed through porting in this baffle. The air-fuel mixture is then ignited with reaction being taken by the latter baffle to provide a tangential force forcing continued rotor rotation. On continued rotor rotation, this working chamber is connected to an exhaust port to exhaust the products of combustion during an exhaust phase with another baffle then sealingly separating this chamber into a portion containing the products of combustion that are being exhausted and another portion which is connected to another intake port to commence another intake phase in a second cycle during the same rotor revolution while the exhaust phase is being completed in the first cycle. Then on continued rotor rotation this one working chamber undergoes in the second cycle similar intake, compression, expansion and exhaust phases so that there is produced from this single working chamber two power phases during every rotor revolution. With each of the three chambers undergoing these cycles every rotor revolution, there are six power phases every rotor revolution with the power phase of one chamber phased to coincide with the compression phase of another chamber so that there are no alternating compression and power pulses on the rotor.

An object of the present invention is to provide a new and improved rotary combustion engine.

Another object is to provide a rotary combustion engine having a rotor concentric with and rotating about a stator with the rotor and stator cooperatively defining a working chamber that rotates with the rotor and has a volume which is varied by baffles mounted on the stator and has an operating cycle having intake, compression, expansion and exhaust phases that occur at least once during every rotor revolution.

Another object is to provide a rotary combustion engine having a rotor concentric with and rotating about a stator with only the stator having intake and exhaust porting and the rotor and stator cooperatively defining a working chamber that rotates with the rotor and has a volume that is varied by baffles mounted on the stator running only against the rotor and has an operating cycle having intake, compression, expansion and exhaust phases that are completed at least once during every rotor revolution.

Another object is to provide a rotary combustion engine having a rotor concentric with and rotating about a stator with the rotor and stator cooperatively defining a working chamber that rotates with the rotor and has a volume that is varied by baffles mounted on the stator and has an operating cycle having intake, compression, expansion and exhaust phases that are completed at least once during every rotor revolution wherein one of the baffles takes reaction during the power phase to produce a tangential force on the rotor and all of the porting for the different phases is in the stator.

Another object is to provide in a rotary combustion engine a rotor that is concentric with and rotates about a stator with these members cooperating to define a plurality of working chambers that are spaced about and move with the rotor and each undergo intake, compression, expansion and exhaust phases twice during a rotor revolution.

Another object is to provide a rotary combustion engine having a rotor concentric with and rotatable about a stator with these members cooperatively defining a plurality of working chambers that are spaced about and rotate with the rotor and undergo intake, compression, expansion and exhaust phases twice during each revolution with expansion in one working chamber phased to coincide with compression in another working chamber.

Another object is to provide a rotary combustion engine having a rotor concentric with and rotatable about a stator with these members cooperatively defining a plurality of working chambers that are spaced about and move with the rotor with intake and exhaust porting provided in the stator sequentially periodically openable to the chambers and baffles mounted on the stator which by sealing contact with the rotor sealingly separate the chambers into intake, compression, expansion and exhaust portions with certain of the baffles also providing valving for connecting a storage charge chamber in the stator first with the compression portion of a working chamber and then with the expansion portion of this chamber.

Another object is to provide a rotary combustion engine having a rotor concentric with and rotatable about a stator with these members cooperatively defining a plurality of working chambers that are spaced about and move with the rotor and baffles on the stator which by sealing contact with the rotor sealingly separate the chambers into intake, compression, expansion and exhaust portions and wherein the seals on the baffles act against a smooth interior peripheral wall and inner side faces of the rotor which are unbroken by ports, spark plug chambers or other surface irregularities detrimental to seal life.

Another object is to provide a rotary combustion engine having a rotor concentric with and rotatable about a stator with these members cooperatively defining three chambers which are spaced about and rotate with the rotor and intake and exhaust ports, baffles and storage chambers located in the stator for cooperating with these chambers so that each chamber during one rotor revolution twice experiences intake, compression, expansion and exhaust to provide two power pulses during each rotor revolution to power the rotor.

These and other objects of the present invention will be more apparent from the following description and drawings in which.

Figure 1:
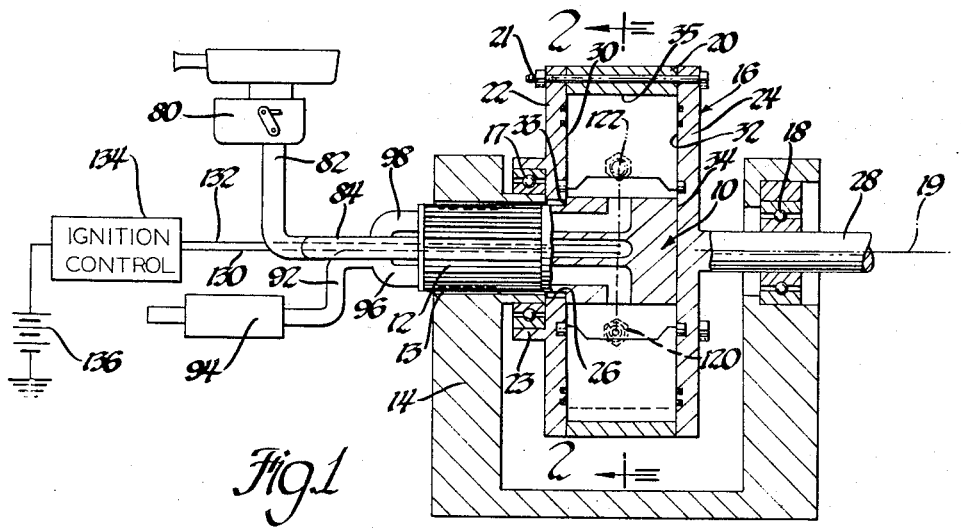
FIG. 1 is a side elevation view with parts in section and parts shown schematically of a rotary combustion engine according to the present invention.
Figure 3:
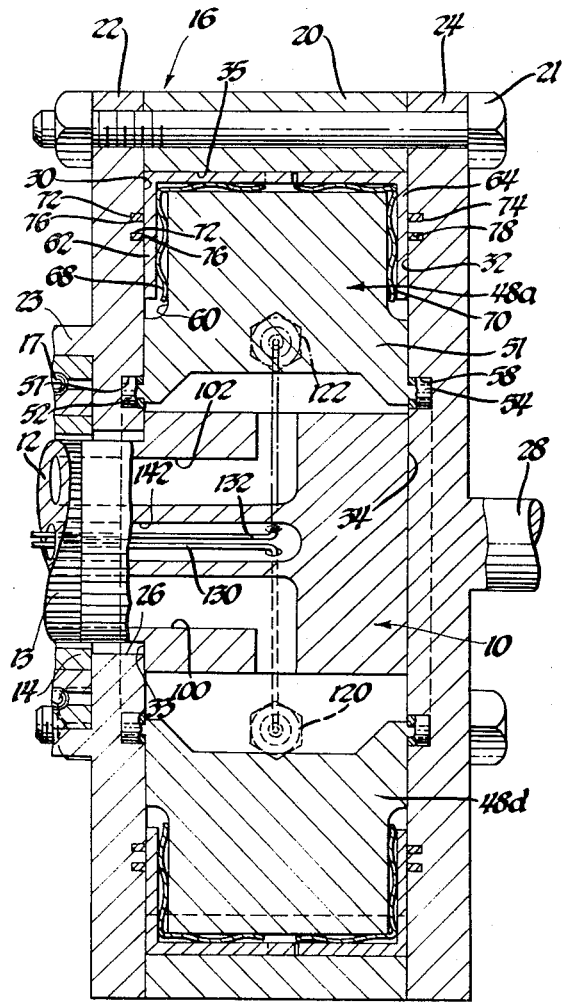
FIG. 3 is a view of the engine taken along the line 3—3 in FIG. 2.
Figure 4:
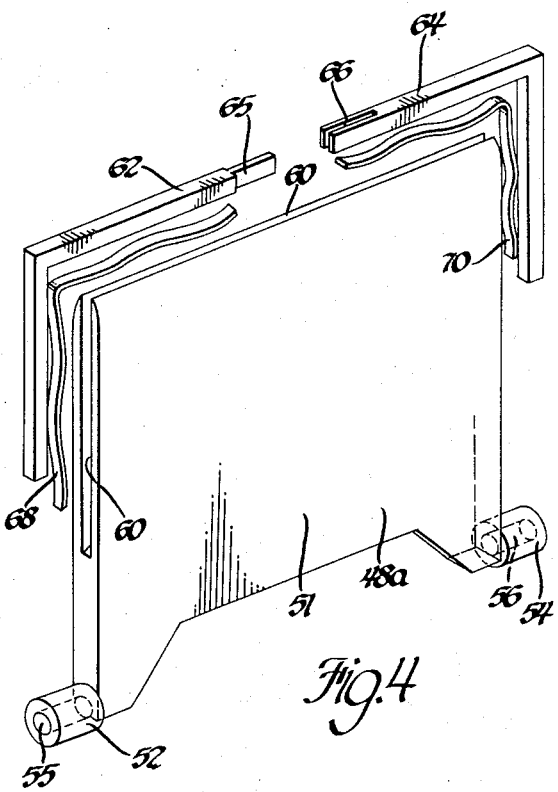
FIG. 4 is an enlarged exploded perspective view of one of the baffles of the engine in FIG. 1.
Figure 5:
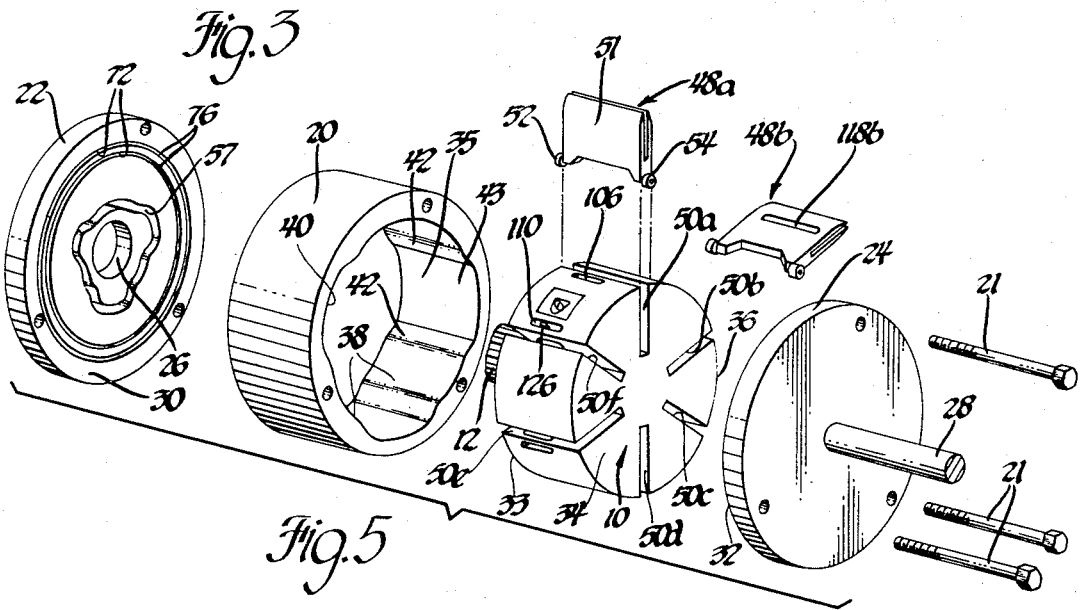
FIG. 5 is an exploded perspective view of certain parts of the engine in FIG. 1.

Referring to FIG. 1, there is shown a rotary combustion engine according to the present invention comprising a stator 10 having a dead hub 12 which is fixed such as by a press fit spline connection 13 to a frame 14. The stator 10 is received in a rotor 16 which is supported on frame 14 by bearings 17 and 18 for rotation about an axis 19. The rotor 16 comprises an annulus 20 that is arranged about the stator 10 and is secured by bolts 21 between a pair of side plates 22 and 24 as shown in FIGS. 1, 3 and 5. The side plate 22 has a hub 23 fitting on the bearing 17 and a central aperture 26 through which the dead hub 12 extends for connection to the frame 14. The other side plate 24 has a shaft 28 integral therewith which is centered on the rotor's axis 19 and is mounted in the bearing 18 and serves as the engine's output. The side plates 22 and 24 have interior side walls 30 and 32, respectively, which are perpendicular to the rotor's axis and are spaced a running clearance away from the stator's sides 33 and 34, respectively, which are also perpendicular to the rotor's axis. The annulus 20 has an interior peripheral wall 35 that extends about and is parallel to the rotor's axis 19 and the stator 10 has an exterior peripheral wall 36 that is opposite the rotor's interior peripheral wall 35 and is also parallel to the rotor's axis 19.

Figure 2:
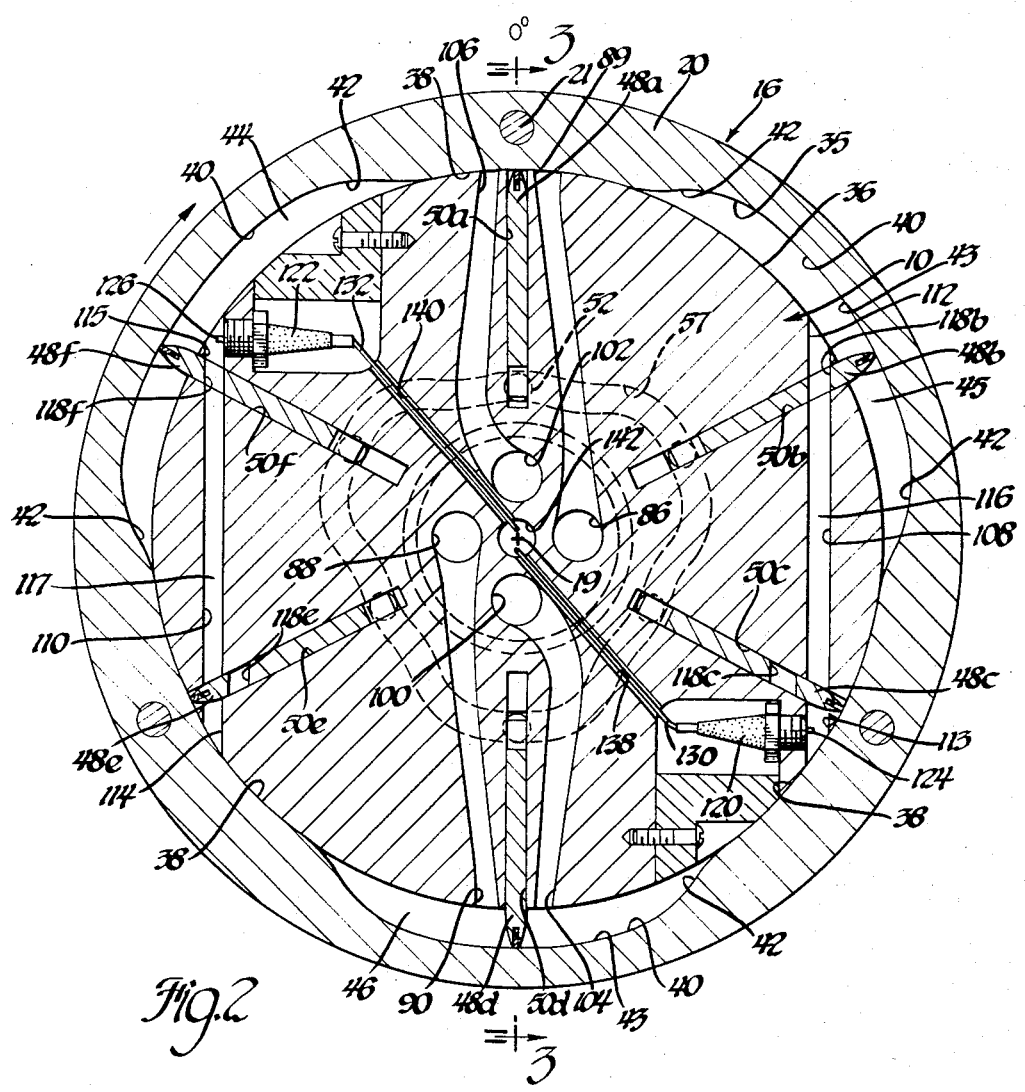
FIG. 2 is an enlarged view of the engine taken along the line 2—2 in FIG. 1.

As shown in FIG. 2, the stator's exterior peripheral wall 36 is a right circular cylinder with its center on the axis 19 and the rotor's interior peripheral wall 35 has a three-lobed cylindrical profile having three circular arc portions 38 with the same radius and a common center on the rotor's axis 19. The three circular arc portions 38 have equal circumferential lengths and are equally angularly spaced about the rotor's axis 19, i.e., 120° apart, and have a radius slightly larger than that of the stator's peripheral wall 36 so that there is running clearance therebetween. The rotor's peripheral wall 35 in each of the zones intermediate the circular arc portions 38 has a concave portion 40 which at its opposite angularly spaced ends has ramp portions 42 which extend gradually radially outward at opposite inclinations to each other from the adjacent circular arc portions 38 to smoothly join these circular arc portions with a circular arc portion 43 which defines the concave portion's base. The three concave portions 40 have equal circumferential lengths and are equally angularly spaced about the rotor's axis 19, i.e., 120° apart, and their circular arc portions 43 have the same radius and a common center on the rotor's axis 19 and circumferential lengths approximately equal to those of the circular arc portions 38. The stator's peripheral wall 36, the rotor's peripheral wall 35 and the rotor's side walls 30 and 32 cooperatively define three working chambers 44, 45 and 46 which are equally angularly spaced about the interior of the rotor 16, i.e., 120° apart, and move with the rotor as it rotates about the stator 10.

Six baffles 48a, 48b, 48c, 48d, 48e and 48f are mounted on the stator 10 in radial slots 50a, 50b, 50c, 50d, 50e and 50f, respectively, which are equally angularly spaced about the rotor's axis 19, i.e. 60° apart. Referring to FIGS. 2, 3, 4 and 5, each of the baffles 48 comprise a plate 51 which is slidable in its respective stator slot 50 which extends parallel to the rotor axis 19 from one rotor side 33 to the other rotor side 34. Two rollers 52 and 54 are rotatably mounted on spindles 55 and 56, respectively, which are formed in axial alignment on the radially inward corners of baffle plate 51. The rollers 52 and 54 are received and roll in guide grooves 57 and 58 which are formed in the rotor side walls 30 and 32, respectively. The guide grooves 57 and 58 are radially inward of and have the same profile as the rotor's interior peripheral wall 35 so that through the action of the rollers rolling the side housing guide grooves 57 and 58, the baffles 48 are caused to move radially so that their radial outward edges closely follow the rotor's interior peripheral wall 35 as the rotor rotates.

Gas sealing of the engine's working chambers 44, 45 and 46 is provided by seals mounted on the baffles 48 and also on the rotor 16. Describing first the baffle seals, each of the baffle plates 51 has a groove 60 which extends the length of the radially outward edge thereof and midway down the radial edges thereof. A pair of right angle seal members 62 and 64 are received in the groove 60 and are sealingly linked by a tongue 65 on the seal member 62 received in a groove 66 on the other seal member 64. Two right angle wave springs 68 and 70 are received in the groove 60 to urge the respective seal members 62 abd 64 both radially and axially outward to maintain sealing contact with the rotor's interior peripheral wall 35 and the respective rotor side walls 30 and 32. Describing now the rotor's gas sealing arrangement, there is provided in the side walls 30 and 32 pairs of circular grooves 72 and 74 in which are mounted circular seal rings 76 and 78, respectively, this gas sealing arrangement being concentric with the rotor. The side seals 76 and 78 slide on the respective rotor sides 33 and 34 as the rotor rotates and are radially located so that they also slide on the radial arms of the baffles' seal members 62 and 64 where the latter seals extend radially inward of the chambers while the baffle seal members 62 and 64 move radially with the baffle plate 51 to maintain their contact with the rotor walls. Thus, the chambers 44, 45 and 46 are effectively sealed by cooperation between the baffle seals and the rotor seals as the rotor rotates.

Figure 6:
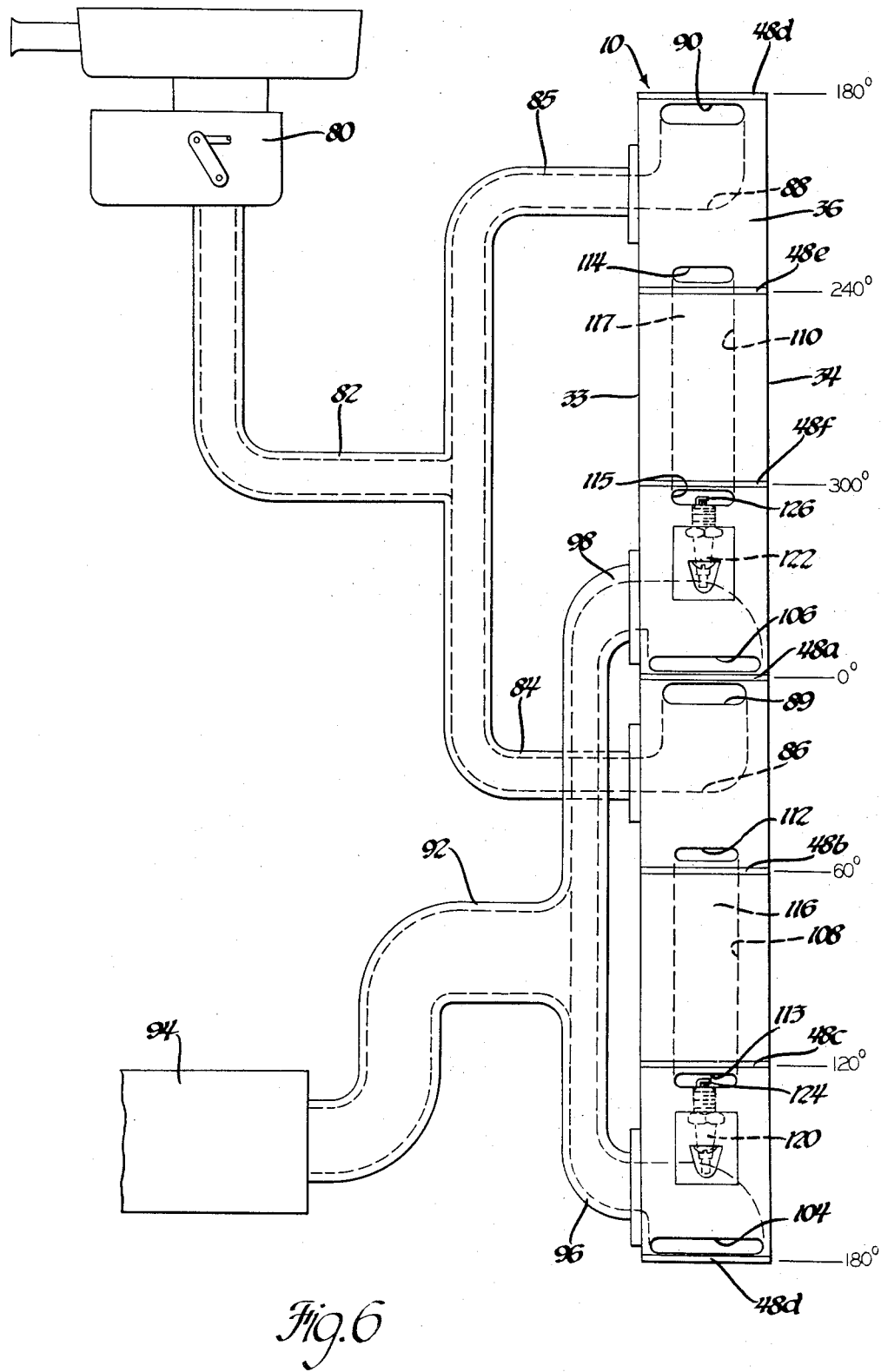
FIG. 6 is a plan development of the peripheral surface of the stator with intake and exhaust manifolds attached of the engine in FIG. 1.

The engine has an intake system comprising a carburetor 80 which provides a controlled delivery of air-fuel mixture to an intake manifold 82 which has two branches 84 and 85 as shown in FIGS. 1 and 6. The intake manifold 82 is secured to the left-hand end of the stator's dead hub 12 with the manifold branches 84 and 85 mating with intake passages 86 and 88, respectively, formed in the stator 10. As shown in FIGS. 2 and 6, the intake passages 86 and 88 extend axially to within the stator's side walls 33 and 34, and then bend at right angles and extend radially outward and terminate as intake ports 89 and 90, respectively, in the stator's peripheral wall 36 where they are sequentially periodically opened to the chambers 44, 45 and 46 by valve action provided by the rotor's circular arc portions 38. The intake ports 89 and 90 are located at diametrically opposite positions and designating the baffle 48a as being located at a 0° reference angle and measuring increasing angle from this reference in the clockwise direction as viewed in FIG. 2, the intake port 89 is located intermediate baffle 48a and 48b at about 5° and the other intake port 90 is located intermediate baffles 48d and 48e at about 185° as shown in both FIGS. 2 and 6.

The engine's exhaust system includes an exhaust manifold 92 that is connected to deliver the engine's exhaust to a suitable emission reduction device 94 and has two branches 96 and 98 which are secured to the left-hand end of the stator 10 as shown in FIGS. 1 and 6. The exhaust branches 96 and 98 mate with intake passages 100 and 102 which extend axially to within the stator's walls 33 and 34 and then bend at right angles to extend radially outward and terminate as exhaust ports 104 and 106 in the stator's peripheral surfaces 36 where they are sequentially periodically opened to the chambers 44, 45 and 46 by valve action provided by the rotor's circular arc portions 38. The exhaust ports 104 and 106 are located at diametrically opposite positions with the exhaust port 104 located between the baffles 48c and 48d at about 175° and the other exhaust port 106 located between the baffles 48f and 48a at about 355° as shown in both FIGS. 2 and 6. Thus, the chambers 44, 45 and 46 are sequentially periodically opened to intake port 89, exhaust port 104, intake port 90 and exhaust port 106 as the rotor 16 rotates in the clockwise direction indicated by the arrow in FIG. 2. Thus, the circular arc portions 38 of rotor 16 provide rotary valving for controlling the engine's intake and exhaust with the baffle seals running against the unbroken surface of the rotor's interior peripheral wall 35 as will be described in more detail later.

The engine further has valving for controlling the engine's compression and expansion comprising two transfer passages 108 and 110 which extend chordally of the stator's peripheral wall 36 and parallel to each other at 0° as shown in FIG. 2. The transfer passage 108 intersects the baffle slots 50b and 50c and at one end has an entrance port 112 in the stator's peripheral wall 36 at a position intermediate the intake port 89 and the baffle 48b and at the other end has an exit port 113 in the stator's peripheral wall 36 at a position intermediate the baffle 48c and the exhaust port 104. The other transfer passage 110 intersects the baffle slots 50e and 50f and at one end has an entrance port 114 in the stator's peripheral wall 36 at a position intermediate the intake port 90 and the baffle 48e and at the other end has an exit port 115 in the stator's peripheral wall 36 at a position intermediate the baffle 48f and the exhaust port 106. In the embodiment shown, the entrance port 112 is located at about 55° and the exit port 113 is located at about 125° and the other entrance port 114 is located diametrically opposite the entrance port 112 and is thus at about 235° and the other exit port 115 is located diametrically opposite the exit port 113 and is thus at about 305°. The transfer passages 108 and 110 between the baffles 48b and 48c and the baffles 48e and 48f provide storage charge chambers 116 and 117, respectively. The engine's working chambers 44, 45 and 46 are sequentially periodically opened to the storage chambers 116 and 117 by valving provided by porting in the baffles 48b and 48c and porting in the baffles 48e and 48f, respectively. With regard to storage charge chamber 116, the baffle 48b has a port 118b through its plate having the same cross-section as the transfer passage 108. The port 118b is radially located in the baffle 48b so that when this baffle is at its full radial extension as shown in FIG. 2, it fully opens this transfer passage's entrance port 112 to the chamber 116, and as the baffle is moved radially inward to its innermost position, the baffle plate closes off this connection. The baffle 48c has a port 118c through its plate that has a cross-section the same as that of the transfer passage 108 and is radially located so that when this baffle is at its radially innermost position as shown in FIG. 2, the baffle plate blocks the storage charge chamber 116 from the exit port 113 and as the baffle moves radially outward, the port 118c opens the storage charge chamber 116 to the exit port 113 with the passage therebetween being fully open when the baffle has reached its outermost position. Regarding the other storage charge chamber 117, the baffles 48e and 48f have ports 118e and 118f, respectively, identical to the ports 118b and 118c in the baffles 48b and 48c to provide similar controlled connection between the entrance port 114 and storage charge chamber 117 and between this storage charge chamber and the exit port 115.

Ignition of the air-fuel mixture in the chambers 44, 45 and 46 is effected by two spark plugs 120 and 122 which are mounted on the stator 10 with their respective electrodes 124 and 126 located in the exit ports 113 and 115 of the transfer passages 108 and 110, respectively, as best shown in FIG. 2. The spark plugs 120 and 122 are connected by high voltage leads 130 and 132, respectively to an ignition control 134 which is powered by a D.C. power source 136, the high voltage leads 130 and 132 extending through radial passages 138 and 140 and then via a central axially extending passage 142 in the stator outward of the engine through the dead hub 12. The ignition control 134 includes a conventional distributor driven by the engine's output shaft 28 that operates to deliver ignition pulses to the spark plugs 120 and 122 at the proper time as will be described in more detail later.

Figure 7:
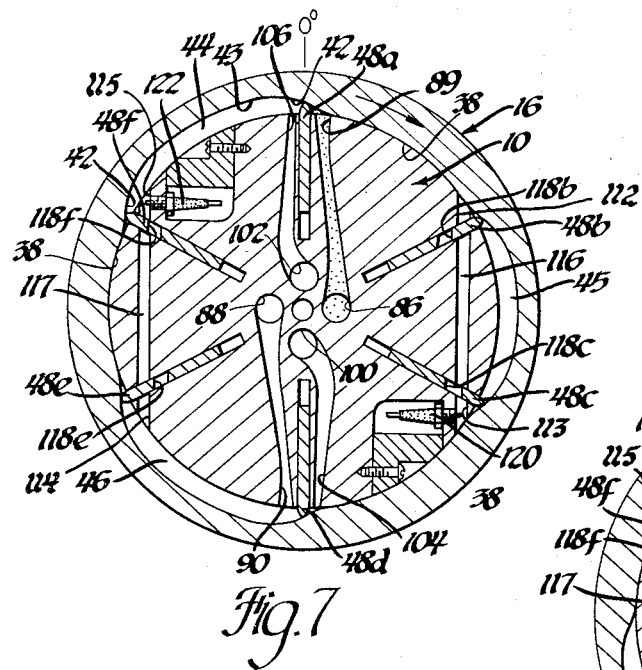
FIGS. 7 through 14 are schematic views similar to FIG. 2 showing sequential positions of the rotor relative to the stator during engine operation.

Describing now the engine operation, reference will be made to FIGS. 7 – 14 which depict sequential events in the engine's operating cycle with rotor rotation in the clockwise direction as indicated by the arrows in these views. In FIG. 7, the rotor 16 is shown at what will be designated its 0° position for chamber 44 since it is at this position that an intake phase for chamber 44 begins. In the 0° rotor position, the baffle 48a is moving radially outward along the leading ramp 42 in chamber 44. With radial outward movement of the baffle 48a, the chamber 44 is divided by the baffle 48a into sealingly separated portions with the chamber which is shown shaded being located to the right of and leading the other portion of the chamber on the other side of this baffle relative to rotor rotation. The leading intaking portion of the chamber 44 is opening to the intake port 89 and remains open thereto and increases in volume while the trailing portion of the chamber 44 is closed to this intake port and decreases in volume with continuing rotor rotation.

Figure 8:
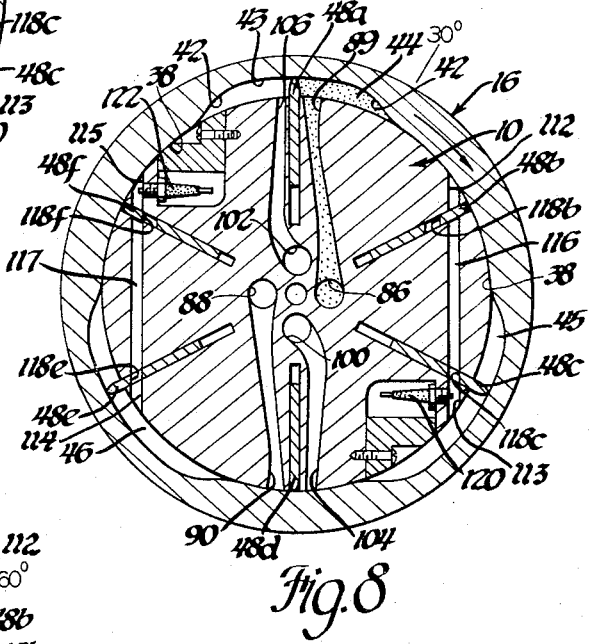
Figure 9:
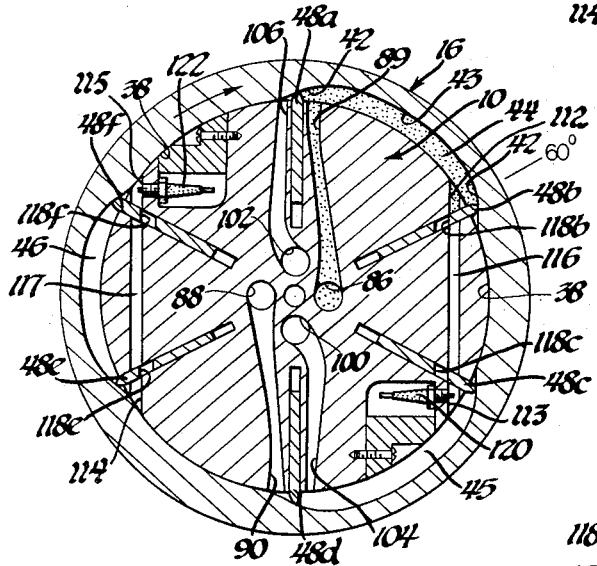
Figure 10:
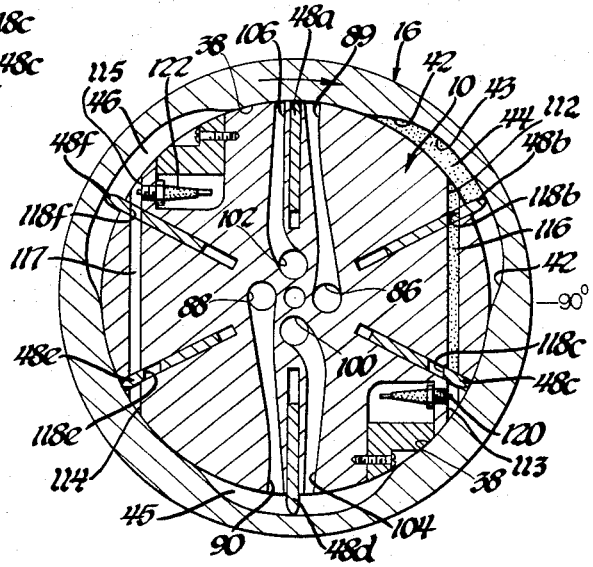

With expansion of the leading portion of the chamber 44, air-fuel mixture is drawn in through intake port 89 as the rotor 16 continues to rotate as shown in FIG. 8 wherein the rotor has progressed to a 30° position which is the midpoint in the intake phase. Between the FIG. 7 and FIG. 8 positions, the baffle 48a moves radially outward to contact the circular arc portion 43 of chamber 44 and with continued rotor rotation, the baffle 48a eventually engages the trailing ramp 42 and moves radially inward while the leading ramp 42 is engaged by the baffle 48b which is then moving radially outward as shown in FIG. 9, this occurring when the rotor has reached a 60° position. At this position, the intaking portion of chamber 44 is at maximum volume in its intake phase and the rotor's trailing circular portion 38 between chambers 44 and 46 is advancing to close off the intake port 89 to the chamber 44 while the port 118b in the baffle 48b is moving radially outward to connect the chamber 44 on the trailing side of baffle 48b through the entrance port 112 to the storage charge chamber 116. At the same time, the storage charge chamber 116 is being closed at its exit port 113 by the baffle 48c which is being moved radially inward in contact with the trailing ramp 42 of chamber 45. This completes the intake phase and then compression begins with continuing rotor rotation with the air-fuel mixture in the chamber 44 as shown by the shading in FIG. 9 trapped on the trailing side of the baffle 48b, i.e., the baffle 48b now divides the chamber 44 into sealingly separated portions with the trailing portion which contains the air-fuel mixture decreasing in volume with continuing rotor rotation. With the opening of the entrance port 112 via baffle port 118b to the storage charge chamber 116 and the closing of this storage charge chamber to its exit port 113, and on continued rotor rotation as shown in FIG. 10, the air-fuel mixture in the chamber 44 is forced into the storage charge chamber 116 and compressed, FIG. 10 illustrating the rotor at a 90° position which represents the midpoint in the compression phase of the engine's cycle.

Figure 11:
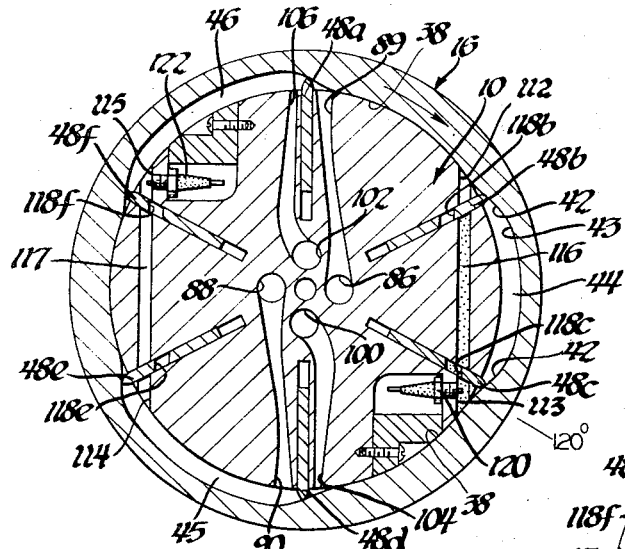
Figure 12:
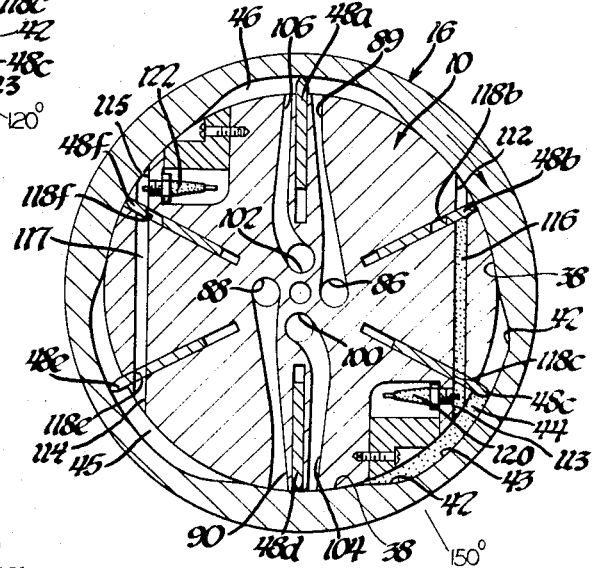
Figure 13:
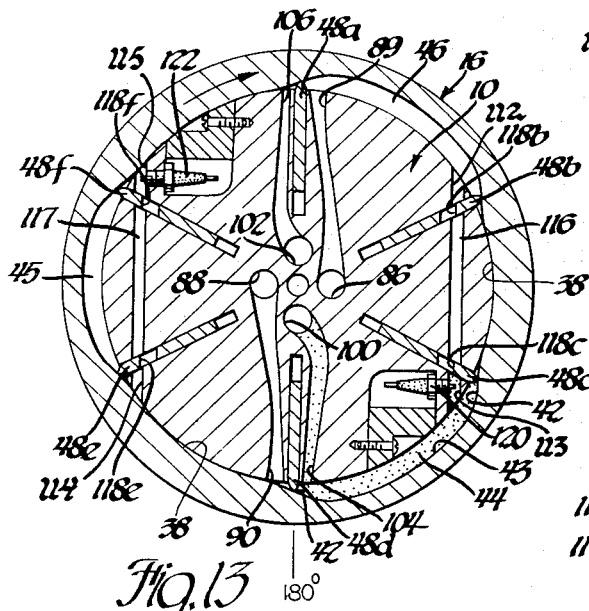
Figure 14:
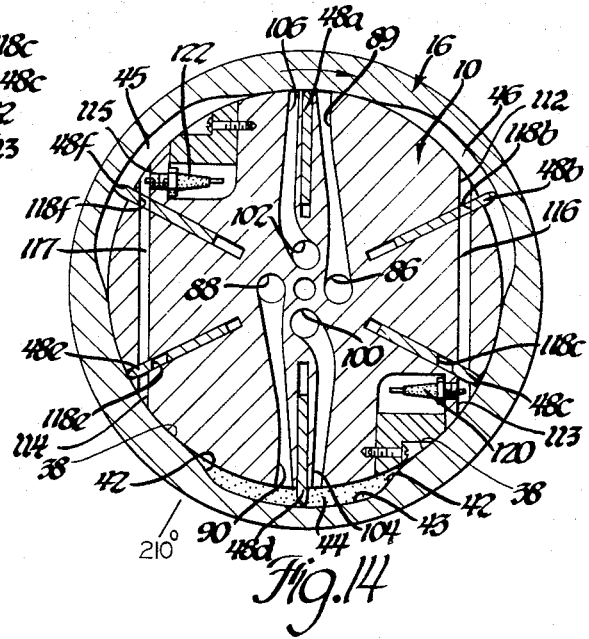

Compression of the air-fuel mixture continues with rotor rotation and is completed when the rotor 16 has rotated to a 120° position as shown in FIG. 11. At the 120° rotor position the baffle 48b has moved radially inward along the trailing ramp 42 to block the entrance of the storage charge chamber 116 while the baffle 48c begins moving radially outward along the leading ramp 42 to open the baffle port 118c and hence the storage charge chamber 116 to the exit port 113 where the electrode 124 of the spark plug 120 is located. The ignition control 134 is timed to provide an ignition pulse at this time to ignite the compressed air-fuel mixture whereupon it now expands in both the storage charge chamber 116 and the chamber 44 in the sealed portion on the leading side of the baffle 48c shown by the shading in FIG. 11. The baffle 48b takes the reaction in the storage charge chamber 116 and the baffle 48c takes the reaction in chamber 44 with the expanding gas providing a tangential force on the rotor 16 to force its continued clockwise rotation. With continued rotation of the rotor during the power phase, the baffle 48c moves further radially outward in contact with the circular arc portion 43 of chamber 44 while the baffle 48b moves radially inward to contact the rotor's circular arc portion 38 between chambers 44 and 46 as shown in FIG. 12 wherein the rotor is shown at a 150° position which is the midpoint in the power phase of the cycle. With continuing rotation of the rotor, the leading ramp 42 of the chamber 44 comes into contact with the baffle 48d while the baffle 48c comes into contact with the trailing ramp 42 of this chamber with these baffles thus moving radially outward and inward, respectively. Baffle 48c having moved radially inward in consonance with the ramp 42 onto the rotor's circular arc portion 38 between chambers 44 and 46, the baffle port 118c and hence the storage charge chamber 116 is closed to the exit port 113 and thus to the chamber 44 while the chamber 44 has opened to the exhaust port 104 on the trailing side of the baffle 48d, such events having occured at the 180° rotor position as shown in FIG. 13. This constitutes the end of the power phase and the beginning of the exhaust phase with the products of combustion then being forced out of chamber 44 through the exhaust port 104 as the rotor continues rotating clockwise with the midpoint in this exhaust phase being reached when the rotor is at the 210° position shown in FIG. 14 and finishing when the rotor has advanced another 30° to a 240° rotor position.

However, at the 180° rotor position shown in FIG. 13, the chamber 44 on the leading side of the baffle 48d starts opening to the other intake port 90 to start another cycle for chamber 44 identical to that just described through 240° of rotor rotation but now using the intake port 90, the storage charge chamber 117, baffles 48e and 48f, spark plug 122 and exhaust port 106. Thus, at 180° and also 360° of rotor rotation the chamber 44 is simultaneously ending and beginning cycles having the four phases of Otto cycle, namely intake, compression, expansion and exhaust. In the latter of these cycles, the intake phase is completed at 240°, the compression phase is completed at 300°, the expansion phase is completed at 360° and the exhaust is completed 60° thereafter. The other chambers 45 and 46 experience the same cycles as the chamber 44 with the firing order for the chamber 44 being at 120° and 300°, that for the chamber 45 being at 180° and 360°, and that for the chamber 46 being at 240° and 60°. Since each chamber experiences two power phases every rotor revolution, the subject arrangement is the equivalent of a 12-cylinder four cycle engine since there is produced a power stroke for every 60° of rotor rotation. Furthermore, there is phased compression of one chamber with concurrent firing of another chamber as can, for example, be seen in FIG. 12 wherein the chamber 44 is at the midpoint of its power phase while the chamber 45 is at the midpoint of its compression phase so that there are no alternating pulsations on the rotor. Furthermore, it will be appreciated that the volume of each of the chambers during expansion can be made larger than their effective volume during intake allowing for more expansion and thus a more complete combustion of a given intake charge by simply locating the intake ports 89 and 90 to open to the chambers later in the intake phase of the cycle. Furthermore, it will be appreciated that an engine of this configuration has the inherent capability of being its own air-injectionreactor pump, at no increase in the number of parts, which pump can be used to inject additional air into the products of combustion exiting via the exhaust ports 104 and 106 thus reducing the pollutants emitted by the engine, i.e., each expanding working chamber such as chamber 44 as it passes over baffle 48b at 90° as best seen in FIG. 10, and as it passes over baffle 48e at 270° can be vented to the atmosphere via suitable ports which would permit the chamber to fill with air rather than to expand in a vacuum as shown. The air thus entrapped in chamber 44 would subsequently be evacuated by suitable ports leading directly to exhaust port 104 as the contracting chamber passes over baffle 48c as seen in FIG. 12.

Thus, the present embodiment is particularly suitable for automotive use since there are no alternating compression and power strokes which would produce torsional pulsations and instead there is a substantially flat torque curve which extends to very low engine speed. However, it will be understood that where alternating compression and power phases are acceptable, a single power phase for every rotor revolution is obtainable with a single working chamber and three baffles located 120° apart with a single spark plug located and timed to fire at 240° rotor rotation.

The above described embodiments are illustrative of the invention which may be modified within the scope of the appended claims.

I claim:

1. A rotary combustion engine comprising a stator having an exterior circular peripheral wall and a pair of exterior oppositely facing side walls, a rotor concentric with and rotatable about said stator having interior opposed side walls opposite said side walls of said stator and also an interior peripheral wall opposite said peripheral wall of said stator having a circular arc portion fitting said peripheral wall of said stator and a concave portion, said stator and rotor walls cooperating to provide a working chamber that rotates with said rotor about said stator, intake passage means in said stator including an intake port extending through said peripheral wall of said stator whereby said circular arc portion periodically closes said intake port and said intake port is periodically opened to said working chamber to deliver a combustible mixture thereto during rotor rotation, a storage charge chamber in said stator having an entrance port and also an exit port through said peripheral wall of said stator whereby said entrance port and said exit port are sequentially periodically opened to deliver compressed combustible mixture to said working chamber during rotor rotation, a spark plug mounted on said stator having an electrode open to the exit port of said storage charge chamber, exhaust passage means in said stator including an exhaust port extending through the peripheral wall of said stator whereby said circular arc portion periodically closes said exhaust port and said exhaust port is periodically opened to said working chamber to receive products of combustion therefrom during rotor rotation, a plurality of baffle means equally angularly spaced about and supported for radial movement on said stator to move radially to maintain sealing contact with said peripheral wall of said rotor while also contacting said side walls of said rotor during rotor rotation to sequentially periodically divide said working chamber into leading and trailing sealed portions on leading and trailing sides of said baffle means relative to the direction of rotor rotation, means for radially moving said baffle means to maintain sealing contact with said peripheral wall of said rotor during rotor rotation, one of said baffle means arranged relative to said intake port and exhaust port so that said working chamber is periodically divided into a leading expanding portion open to said intake port and a trailing contracting portion open to said exhaust port during rotor rotation, a second one of said baffle means arranged relative to said intake port and the entrance port of said storage charge chamber so that said working chamber after passing said one intake port is periodically divided into a leading expanding closed portion and a trailing contracting portion open to the entrance port of said storage charge chamber during rotor rotation, said second baffle means having a valve port for opening the entrance port of said storage charge chamber only when said working chamber is open to the entrance port of said storage charge chamber during rotor rotation, a third one of said baffle means arranged relative to the entrance port and exit port of said storage charge chamber so that said working chamber after passing the entrance port of said storage chamber is periodically divided into a trailing contracting closed portion and a leading expanding portion open to the exit port of said storage charge chamber during rotor rotation, said third baffle means having a valve port for opening the exit port of said storage charge chamber only when said working chamber is open to the exit port of said storage charge chamber during rotor rotation, and ignition means for delivering an ignition pulse to said spark plug when the leading expanding portion of said working chamber is open to the exit port of said storage charge chamber whereby during each rotor revolution said working chamber undergoes intake, compression, expansion and exhaust phases to produce a power pulse to power said rotor.

2. A rotary combustion engine comprising a stator, a rotor concentric with and rotatable about said stator, said stator and rotor having walls cooperating to provide three working chambers that rotate with said rotor about said stator, intake passage means in said stator for delivering a combustible mixture to said working chambers, said intake passage means including two angularly spaced intake ports sequentially periodically opened by the rotor wall to said working chambers during rotor rotation, exhaust passage means in said stator for exhausting said working chambers, said exhaust passage means including two angularly spaced exhaust ports sequentially periodically opened by the rotor wall to said working chambers during rotor rotation, a pair of storage charge chambers in said stator each having an entrance port and also an exit port sequentially periodically opened by the rotor wall to said working chambers during rotor rotation, two spark plugs mounted on said stator each having an electrode open to the exit port of one of said storage charge chambers, six baffle means equally angularly spaced about and supported for radial movement on said stator to move radially to maintain sealing contact with said peripheral wall of said rotor while also contacting said side walls of said rotor during rotor rotation to sequentially periodically divide said working chambers into leading and trailing sealed portions on leading and trailing sides of said baffle means relative to the direction of rotor rotation, means for radially moving said baffle means to maintain sealing contact with said peripheral wall of said rotor during rotor rotation, a first one of said baffle means arranged relative to one of said intake ports and one of said exhaust ports so that said working chambers are sequentially periodically divided into a leading expanding portion open to said one intake port and a trailing contracting portion open to said one exhaust port during rotor rotation, a second one of said baffle means arranged relative to said one intake port and the entrance port of one of said storage charge chambers so that said working chambers after passing said one intake port are sequentially periodically divided into a leading expanding closed portion and a trailing contracting portion open to the entrance port of said one storage charge chamber during rotor rotation, said second baffle means having a valve port for opening the entrance port of said one storage charge chamber only when said working chambers are open to the entrance port of said one storage charge chamber during rotor rotation, a third one of said baffle means arranged relative to the entrance port and exit port of said one storage charge chamber so that said working chambers after passing the entrance port of said one storage chamber are sequentially periodically divided into a trailing contracting closed portion and a leading expanding portion open to the exit port of said one storage charge chamber during rotor rotation, said third baffle means having a valve port for opening the exit port of said one storage charge chamber only when said working chambers are open to the exit port of said one storage charge chamber during rotor rotation, a fourth one of said baffle means arranged relative to the other of said exhaust ports and the other of said intake ports so that said working chambers after passing the exit of said one storage charge chamber are sequentially periodically divided into a trailing contracting portion open to said other exhaust port and a leading expanding portion open to said other intake port during rotor rotation, a fifth one of said baffle means arranged relative to said other intake port and the entrance port of the other of said storage charge chambers so that said working chambers after passing said other intake port are sequentially periodically divided into a leading expanding closed portion and a trailing contracting sealed portion open to the entrance port of said other storage charge chamber during rotor rotation, said fifth baffle means having a valve port for opening the entrance port of said other storage charge chamber only when said working chambers are open to the entrance port of said other storage charge chamber during rotor rotation, the sixth one of said baffle means arranged relative to the entrance port and exit port of said other storage charge chamber so that said working chambers after passing the entrance port of said other storage charge chamber are sequentially periodically divided into a trailing contracting closed portion and a leading expanding portion open to the exit port of said other storage charge chamber during rotor rotation, said sixth baffle means having a valve port for opening the exit port of said other storage charge chamber only when working chambers are open to the exit port of said other storage charge chamber during rotor rotation, and ignition means for delivering an ignition pulse to each of said spark plugs when the leading expanding portions of said working chambers are open to the exit ports of said storage charge chambers whereby during each rotor revolution each of said working chambers twice undergoes intake, compression, expansion and exhaust phases to produce two power pulses to power said rotor.

3. A rotary combustion engine comprising a stator having an exterior peripheral wall and a pair of exterior oppositely facing side walls, a rotor concentric with and rotatable about said stator having interior opposed side walls opposite said side walls of said stator and also an interior three-lobed peripheral wall opposite said peripheral wall of said stator, said stator and rotor walls cooperating to provide three working chambers that rotate with said rotor about said stator, intake passage means in said stator for delivering a combustible mixture to said working chambers, said intake passage means including two intake ports extending through said peripheral wall of said stator at different angular locations whereby said peripheral wall of said rotor sequentially periodically closes said intake ports and said intake ports are sequentially periodically opened to said working chambers during rotor rotation, exhaust passage means in said stator for exhausting said working chambers, said exhaust passage means including two exhaust ports extending through said exterior peripheral wall of said stator at different angular locations whereby said peripheral wall of said rotor sequentially periodically closes said exhaust ports and said exhaust ports are sequentially periodically opened to said working chambers during rotor rotation, a pair of storage charge chambers in said stator each having an entrance port and also an exit port through said peripheral wall of said stator, said entrance ports arranged at different angular locations whereby said entrance ports are sequentially periodically opened to said working chambers during rotor rotation, said exit ports arranged at different angular locations whereby said exit ports are sequentially periodically opened to said working chambers during rotor rotation, two spark plugs mounted on said stator each having an electrode open to the exit port of one of said storage charge chambers, six baffle means equally angularly spaced about and supported for radial movement on said stator to move radially to maintain sealing contact with said peripheral wall of said rotor while also contacting said side walls of said rotor during rotor rotation to sequentially periodically divide said working chambers into leading and trailing sealed portions on leading and trailing sides of said baffle means relative to the direction of rotor rotation, means for radially moving said baffle means to maintain sealing contact with said peripheral wall of said rotor during rotor rotation, a first one of said baffle means arranged relative to one of said intake ports and one of said exhaust ports so that said working chambers are sequentially periodically divided into a leading expanding portion open to said one intake port and a trailing contracting portion open to said one exhaust port during rotor rotation, a second one of said baffle means arranged relative to said one intake port and the entrance port of one of said storage charge chambers so that said working chambers after passing said one intake port are sequentially periodically divided into a leading expanding closed portion and a trailing contracting portion open to the entrance port of said one storage charge chamber during rotor rotation, said second baffle means having a valve port for opening the entrance port of said one storage charge chamber only when said working chambers are open to the entrance port of said one storage charge chamber during rotor rotation, a third one of said baffle means arranged relative to the entrance port and exit port of said one storage charge chamber so that said working chambers after passing the entrance port of said one storage chamber are sequentially periodically divided into a trailing contracting closed portion and a leading expanding portion open to the exit port of said one storage charge chamber during rotor rotation, said third baffle means having a valve port for opening the exit port of said one storage charge chamber only when said working chambers are open to the exit port of said one storage charge chamber during rotor rotation, a fourth one of said baffle means arranged relative to the other of said exhaust ports and the other of said intake ports so that said working chambers after passing the exit of said one storage charge chamber are sequentially periodically divided into a trailing contracting portion open to said other exhaust port and a leading expanding portion open to said other intake port during rotor rotation, a fifth one of said baffle means arranged relative to said other intake port and the entrance port of the other of said storage charge chambers so that said working chambers after passing said other intake port are sequentially periodically divided into a leading expanding closed portion and a trailing contracting sealed portion open to the entrance port of said other storage charge chamber during rotor rotation, said fifth baffle means having a valve port for opening the entrance port of said other storage charge chamber only when said working chambers are open to the entrance port of said other storage charge chamber during rotor rotation, the sixth one of said baffle means arranged relative to the entrance port and exit port of said other storage charge chamber so that said working chambers after passing the entrance port of said other storage charge chamber are sequentially periodically divided into a trailing contracting closed portion and a leading expanding portion open to the exit port of said other storage charge chamber during rotor rotation, said sixth baffle means having a valve port for opening the exit port of said other storage charge chamber only when working chambers are open to the exit port of said other storage charge chamber during rotor rotation, and ignition means for delivering an ignition pulse to each of said spark plugs when the leading expanding portions of said working chambers are open to the exit ports of said storage charge chambers whereby during each rotor revolution each of said working chambers twice undergoes intake, compression, expansion and exhaust phases to produce two power pulses to power said rotor.

4. A rotary combustion engine comprising a stator having an exterior circular peripheral wall and a pair of exterior oppositely facing side walls, a rotor concentric with and rotatable about said stator having interior opposed side walls opposite said side walls of said stator and also an interior three-lobed peripheral wall opposite said peripheral wall of said stator having three equally angularly spaced circular arc portions of equal circumferential length closely fitting said peripheral wall of said stator and concave portions of equal circumferential length intermediate said circular arc portions, said stator and rotor walls cooperating to provide three working chambers that rotate with said rotor about said stator, intake passage means in said stator for delivering a combustible mixture to said working chambers, said intake passage means including two intake ports extending through said peripheral wall of said stator at diametrically opposite locations whereby said circular arc portions sequentially periodically close said intake ports and said intake ports are sequentially periodically opened to said working chambers during rotor rotation, exhaust passage means in said stator for exhausting said working chambers, said exhaust passage means including two exhaust ports extending through said exterior peripheral wall of said stator at diametrically opposite locations whereby said circular arc portions sequentially periodically close said exhaust ports and said exhaust ports are sequentially periodically opened to said working chambers during rotor rotation, a pair of storage charge chambers in said stator each having an entrance port and also an exit port through said peripheral wall of said stator, said entrance ports arranged at diametrically opposite locations whereby said entrance ports are sequentially periodically opened to said working chambers during rotor rotation, said exit ports arranged at diametrically opposite locations whereby said exit ports are sequentially periodically opened to said working chambers during rotor rotation, two spark plugs mounted on said stator each having an electrode open to the exit port of one of said storage charge chambers, said electrodes arranged at diametrically opposite locations, six baffle means equally angularly spaced about and supported for radial movement on said stator to move radially to sealing contact with said peripheral wall of said rotor while also contacting said side walls of said rotor during rotor rotation to sequentially periodically divide said working chambers into leading and trailing sealed portions on leading and trailing sides of said baffle means relative to the direction of rotor rotation, means for radially moving said baffle means to maintain sealing contact with said peripheral wall of said rotor during rotor rotation, a first one of said baffle means arranged relative to one of said intake ports and one of said exhaust ports so that said working chambers are sequentially periodically divided into a leading expanding portion open to said one intake port and a trailing contracting portion open to said one exhaust port during rotor rotation, a second one of said baffle means arranged relative to said one intake port and the entrance port of one of said storage charge chambers so that said working chambers after passing said one intake port are sequentially periodically divided into a leading expanding closed portion and a trailing contracting portion open to the entrance port of said one storage charge chamber during rotor rotation, said second baffle means having a valve port for opening the entrance port of said one storage charge chamber only when said working chambers are open to the entrance port of said one storage charge chamber during rotor rotation, a third one of said baffle means arranged relative to the entrance port and exit port of said one storage charge chamber so that said working chambers after passing the entrance port of said one storage chamber are sequentially periodically divided into a trailing contracting closed portion and a leading expanding portion open to the exit port of said one storage charge chamber during rotor rotation, said third baffle means having a valve port for opening the exit port of said one storage charge chamber only when said working chambers are open to the exit port of said one storage charge chamber during rotor rotation, a fourth one of said baffle means arranged relative to the other of said exhaust ports and the other of said intake ports so that said working chambers after passing the exit of said one storage charge chamber are sequentially periodically divided into a trailing contracting portion open to said other exhaust port and a leading expanding portion open to said other intake port during rotor rotation, a fifth one of said baffle means arranged relative to said other intake port and the entrance port of the other of said storage charge chambers so that said working chambers after passing said other intake port are sequentially periodically divided into a leading expanding closed portion and a trailing contracting sealed portion open to the entrance port of said other storage charge chamber during rotor rotation, said fifth baffle means having a valve port for opening the entrance port of said other storage charge chamber only when said working chambers are open to the entrance port of said other storage charge chamber during rotor rotation, the sixth one of said baffle means arranged relative to the entrance port and exit port of said other storage charge chamber so that said working chambers after passing the entrance port of said other storage charge chamber are sequentially periodically divided into a trailing contracting closed portion and a leading expanding portion open to the exit port of said other storage charge chamber during rotor rotation, said sixth baffle means having a valve port for opening the exit port of said other storage charge chamber only when working chambers are open to the exit port of said other storage charge chamber during rotor rotation, and ignition means for delivering an ignition pulse to each of said spark plugs when the leading expanding portions of said working chambers are open to the exit ports of said storage charge chambers whereby during each rotor revolution each of said working chambers twice undergoes intake, compression, expansion and exhaust phases to produce two power pulses to power said rotor.

* * * * *